(12) United States Patent
Kawamoto et al.

(10) Patent No.: US 6,555,785 B2
(45) Date of Patent: Apr. 29, 2003

(54) WELDING CONDITION INPUTTING EQUIPMENT

(75) Inventors: Atsuhiro Kawamoto, Hyogo (JP);
Akihiko Kitajima, Hyogo (JP);
Norikazu Osaki, Nara (JP); Kunio Kubo, Hyogo (JP); Koji Hamamoto, Hyogo (JP); Shigeki Yonemori, Hyogo (JP); Yoshiyuki Tabata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 09/829,484

(22) Filed: Apr. 10, 2001

(65) Prior Publication Data
US 2002/0023721 A1 Feb. 28, 2002

(30) Foreign Application Priority Data

Apr. 11, 2000 (JP) .................................. 2000-109361
Apr. 11, 2000 (JP) .................................. 2000-109362
Apr. 11, 2000 (JP) .................................. 2000-109365

(51) Int. Cl.$^7$ ................................................ B23K 9/10
(52) U.S. Cl. ..................................... 219/130.5; 219/132
(58) Field of Search ............................. 219/132, 130.1, 219/130.01, 125.1, 124.34, 125.11, 130.5

(56) References Cited

U.S. PATENT DOCUMENTS

| | | | | |
|---|---|---|---|---|
| 4,559,430 A | * | 12/1985 | Hayakawa | 219/125.11 |
| 5,148,000 A | * | 9/1992 | Tews | 219/125.11 |
| 5,171,966 A | * | 12/1992 | Fukuoka et al. | 219/124.34 |
| 5,571,431 A | * | 11/1996 | Lantieri et al. | 219/130.01 |

* cited by examiner

Primary Examiner—Clifford C. Shaw
(74) Attorney, Agent, or Firm—RatnerPrestia

(57) ABSTRACT

A welding condition inputting equipment capable of setting the welding conditions such as welding current and welding voltage easily and securely is disclosed. The welding condition inputting equipment comprises an operating section for inputting the welding conditions, a determining section for selecting items, and a display section for displaying selected items. When the welding conditions are input, the operating section outputs the conditions to the determining section. When the conditions are input in the determining section, the determining section selects items relating to welding corresponding to the conditions, and outputs the items to the display section. When the items are input in the display section, the display section displays the items. The operating section specifically includes a dial, a switch, and a push-in dial switch integrally combining a dial rotation detecting part.

40 Claims, 6 Drawing Sheets

WELDING CONDITION INPUTTING EQUIPMENT

FIELD OF THE INVENTION

The present invention relates to equipment for inputting the welding conditions in a welder.

BACKGROUND OF THE INVENTION

In a conventional welder using arc discharge, the welding conditions are set as follows. First, a welding condition is selected by a switch. The selected welding condition is adjusted by a variable resistor provided for each welding condition. These welding conditions should be input before starting welding operation. When the material and thickness of the base metal and shape of the weld joint are complicated, the welding conditions are also complex.

FIG. 13 is a structural example of a conventional arc welding condition inputting equipment (hereinafter called inputting equipment). For example, when an initial current of 200 A is necessary for initial arc welding, an initial control select switch 56 is set in "Yes" position. Then a variable resistor for initial current 51 is adjusted to a graduation of about 200 A.

In succession, the welding current is set by a variable resistor for welding current 52.

If a crater processing current of 80 A is necessary for crater processing, a crater control select switch 57 is set in "Yes" position. Then a variable resistor for crater processing current 53 is adjusted to a graduation of about 80 A. Herein, crater processing means welding for filling the crater (dimple) formed at the welding terminal end with depositing metal.

For pulse arc welding by using current waveform in pulse form, if a pulse output is necessary, a pulse control select switch 58 is set in "Yes" position. Then the pulse current and the pulse frequency are adjusted in a variable resistor for pulse current 54 and a variable resistor for pulse frequency 55. By the outputs from the variable resistors and switches, the welding conditions are set in an inputting section 59. Further, the inputting equipment requires a variable resistor for slope for forming an ascending or descending slope of current and voltage during arc welding.

Therefore, in the conventional inputting equipment, the total number of variable resistors and switches may exceed twenty. It hence involves possibility of setting error or failure when selecting the switches or adjusting the variable resistors.

Further, because of numerous switches and variable resistors, the operating procedure is complicated and the operator may be confused.

Numerous variable resistors are usually disposed closely in a narrow space. Therefore, at the time of setting, the operator may touch a wrong variable resistor and the adjusted position of the variable resistor may be deviated.

Yet, since the variable resistor is adjusted at an approximate position, the welding conditions may not be always reproduced correctly at the time of re-adjustment. At every input of welding conditions, the user is required to always check the input values.

SUMMARY OF THE INVENTION

The inputting equipment of the invention comprises an operating section for inputting the welding conditions, a determining section for selecting items, and a display section for displaying selected items.

When the welding conditions are input, the operating section outputs the conditions to the determining section. When the conditions are input in the determining section, the determining section selects items corresponding to the conditions, and outputs the items to the display section. When the items are input in the display section, the display section displays the items.

The operating section specifically includes a dial, a switch, and a push-in dial switch integrally combining a dial rotation detecting part.

This equipment is designed to set welding conditions including the initial current, initial voltage, welding current, welding voltage, pulse welding current, and pulse frequency.

DESCRIPTION OF THE PREFERRED EMBODIMENTS (First Exemplary Embodiment)

Figure 1:
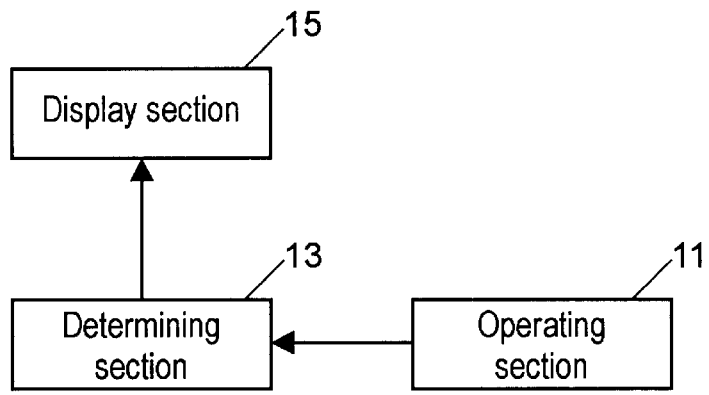
FIG. 1 is a block diagram showing a configuration of welding condition inputting equipment of the invention.

FIG. 1 is a block diagram showing a configuration of inputting equipment of the invention.

When a value relating to a welding condition is input in an operating section 11, the operating section 11 sends the condition into a determining section 13. When the condition is sent from the operating section 11 into the determining section 13, the determining section 13 selects an item to be displayed in a display section 15, from a group of items relating to welding conditions.

Items relating to welding conditions include the following.

1) Welding conditions including initial current, initial voltage, welding current, welding voltage, pulse current, pulse voltage, and pulse frequency. Further, crater welding current and crater welding voltage may be also included. Crater processing is welding for filling a crater (dimple) formed at welding terminal end with depositing metal.

2) Input values that should be set about these welding conditions.

3) A group of input values set previously about these welding conditions.

The operating section makes adjustments for setting the item included in 1) and the input value of 2), and outputs the value being adjusted to the determining section 13 as the adjusting value.

When an item is selected, the determining section 13 sends the item to the display unit 15. When the item is sent from the determining section 13 into the display unit 15, the display unit 15 displays this item.

In this configuration, only the necessary item is displayed. Hence, setting failure is prevented. The operating procedure is simple, and the operating efficiency is enhanced.

Plural items may be also selected from the group of items relating to the welding conditions.

The operating section 11 may be divided into plural units. By dividing the operating section into groups of items, the operating section may be easier to use for the user.

(Second Exemplary Embodiment)

Figure 2:
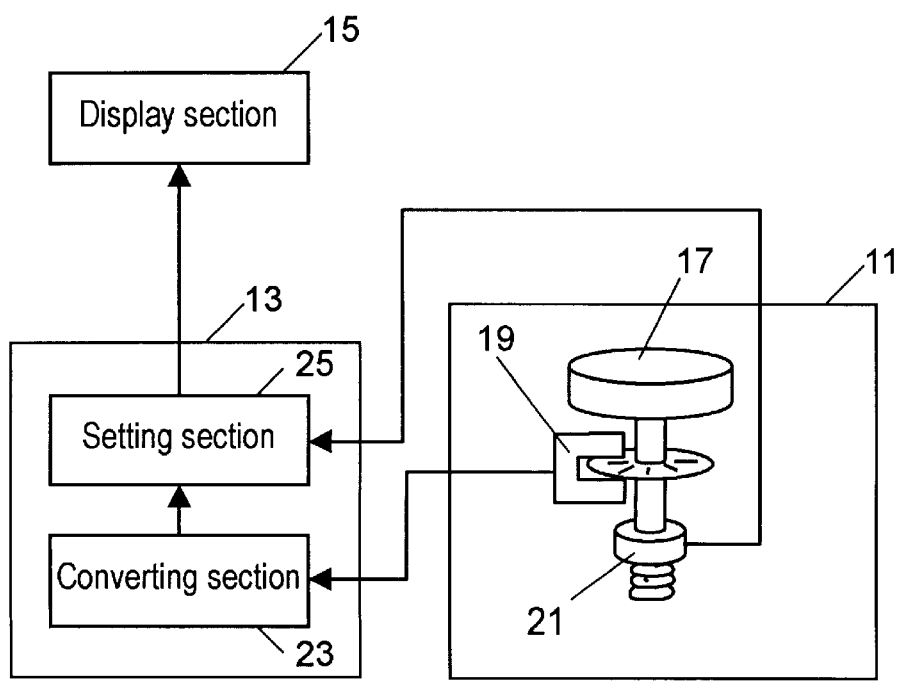
FIG. 2 is a block diagram showing a configuration of dial type welding condition inputting equipment of the invention.

FIG. 2 is a block diagram showing a configuration of inputting equipment of the invention. The same components as in the foregoing embodiment are identified with the same reference numerals.

A dial 17 can be pushed in the direction of rotary shaft. A detector 19 detects the amount of rotation of the dial 17, and outputs a signal (a first signal) corresponding to the detected amount to a converter 23.

The amount of rotation can be detected, for example, in one of the following known methods.

1) Counting the number of light beams detected by a photo sensor of the opposite side of the disc from the light source every time a light beam passes through slits provided in a disc, during rotation of the disc.

2) Detecting changes of the magnetism of the magnet provided in the disc accompanying rotation of the disc.

3) Converting the amount of rotation into an electric resistance value.

A switch 21 is coupled to the dial 17. When the dial 17 is pushed in, the switch 21 sends a signal (a second signal) noticing the push-in operation to a setting section 25.

The converting section 23 converts the signal output from the detector 19 to the value showing the amount of rotation sequentially as the adjusting value. The signal showing this numerical value is output to the setting section 25. Receiving the signal from the switch 21, the setting section 25 determines the numerical value from the converting section 23 as the input value of the welding condition being selected at the present. Herein, the selected welding condition is the same as the welding condition displayed in the display section 15.

Successively, the setting section 25 selects a next welding condition to be input from the item group, and sends the signal of the welding condition to the display section 15.

In this configuration, by using one dial coupled with the switch, the welding conditions can be input. Further, the switch coupled to the dial can determine the selection of welding condition and also determine the input value. Therefore, if touching the dial unexpectedly, the input value is not deviated.

The dial 17, detector 19, and switch 21 correspond to the operating section 11 in FIG. 1. The dial 17, detector 19, and switch 21 may be combined integrally into a push-in switch.

(Third Exemplary Embodiment)

Figure 3:
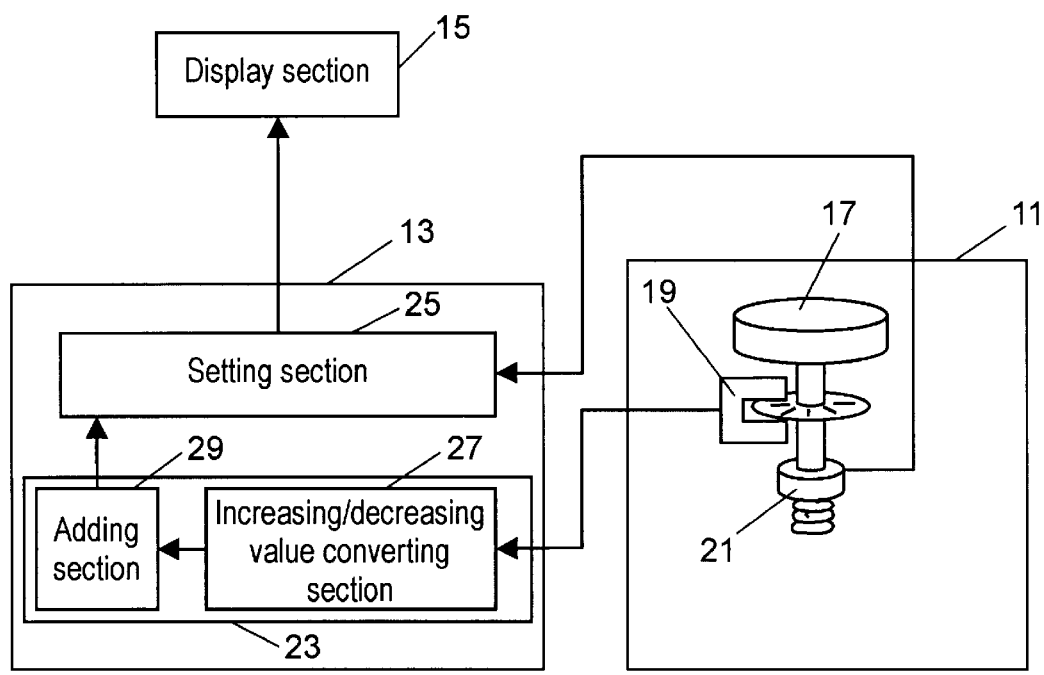
FIG. 3 is a block diagram showing a configuration of dial type welding condition inputting equipment of the invention.

FIG. 3 is a block diagram showing a configuration of inputting equipment of the invention. The same components as in the foregoing embodiments are identified with the same reference numerals.

An increasing/decreasing value converting section 27 provides the signal output from a detector 19 with a sign corresponding to the rotating direction of the dial 17, and converts the signed signal sequentially into an increasing or decreasing value.

Herein, the rotating direction of the dial 17 is detected by an increase or a decrease of the resistance value, for example, when the amount of rotation is converted into a resistance value.

The increasing/decreasing value converting section 27 outputs the increasing or decreasing value into an adding section 29. The adding section 29 outputs the numerical value indicating the amount of rotation, which is obtained by adding the increasing or decreasing value sequentially on a reference value, to the setting section 25 as the adjusting value. When the output signal from the switch 21 is input into the setting section 25, the setting section 25 determines the numerical value indicating the amount of rotation output from the adding section 29 at this time, as the input value of the welding condition selected at present.

In this configuration, the same effects as in the second exemplary embodiment are obtained.

The determining section 13 in the first exemplary embodiment, and the setting section 25 in the second and third exemplary embodiments may be designed as follows:

1) to select all items of welding conditions, or 2) to select welding conditions grouped according to their relation, from the item group, and output a list of the welding conditions in the display unit 15. In this case, by using this list, the setting section 25 may output a signal for identifying the welding condition being selected at present (for example, a flicker display signal) to the display section 15.

The display section 15 is composed of LCD display or other display device.

The determining section 13 in the first exemplary embodiment or the setting section 25 may show which step is conducted in the welding sequence, in the item of the welding condition selected at present, by means of the display section 15. Herein, the steps in the welding sequence includes, for example, initial welding, main welding, or crater welding.

(Fourth Exemplary Embodiment)

Figure 4:
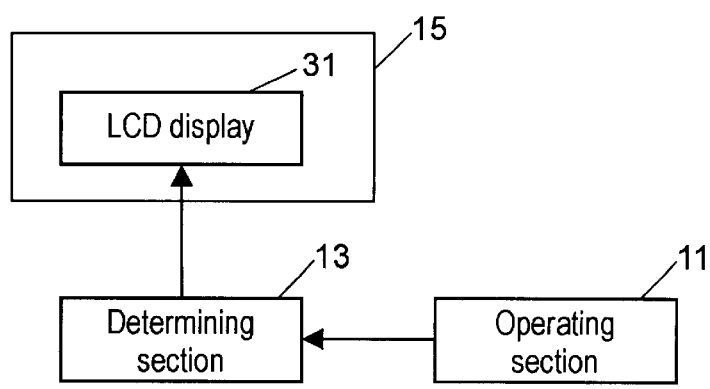
FIG. 4 is a block diagram showing a configuration of welding condition inputting equipment with LCD display of the invention.

FIG. 4 is a block diagram showing a configuration of inputting equipment of the invention. The same components as in the foregoing embodiments are identified with the same reference numerals.

The output of an operating section 11 is input into a determining section 13. The determining section 13 outputs the signal of the welding condition being selected at present to a LCD display 31. Receiving this signal, the LCD display 31 displays the welding condition according to its display capacity.

Figure 5:
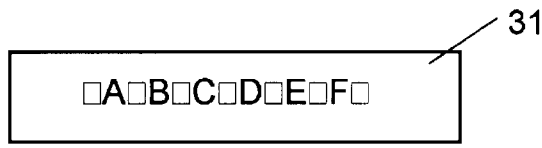
FIG. 5 is a display example of one-line LCD display of welding condition inputting equipment of the invention.

FIG. 5 is a display example of welding conditions in one-line LCD display 31. In the diagram, A, B, C, D, E, F indicate items relating to the welding conditions.

Figure 6:
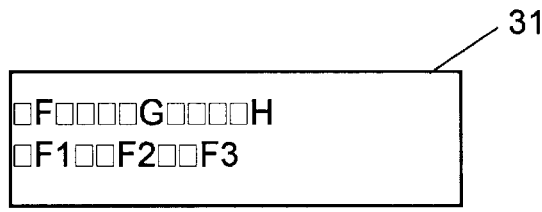
FIG. 6 is a display example of two-line LCD display of welding condition inputting equipment of the invention.
Figure 7:
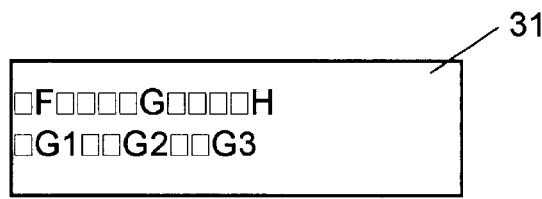
FIG. 7 is a display example of two-line LCD display of welding condition inputting equipment of the invention.
Figure 8:
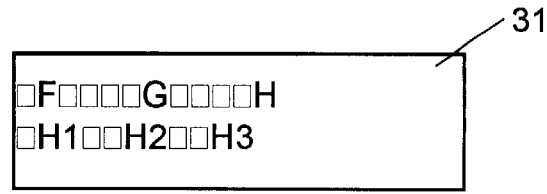
FIG. 8 is a display example of two-line LCD display of welding condition inputting equipment of the invention.

FIG. 6, FIG. 7, and FIG. 8 are display examples of welding conditions in LCD display 31 for displaying two lines or more. In the diagrams, F, G, H denote group names of the grouped welding conditions. Specifically, F1, F2, F3 show welding conditions belonging to group F. Similarly, G1, G2, G3 show welding conditions belonging to group G, and H1, H2, H3, belonging to group H. In this example of display, the first line refers to the group name, and the second and subsequent lines indicate the welding conditions belonging to the specific group.

In the embodiments shown in FIG. 5 to FIG. 8, the signal supplied into the LCD display 31 is the output from the determining section 13. The output from the setting section 25 included in the components of the determining section 13 may be also input. The first line of the LCD display 31 in FIG. 5 to FIG. 8 shows a fixed welding condition, but the display in the LCD display 31 can be changed by the signal input from the determining section 13.

The LCD display 31 in FIG. 5 to FIG. 8 shows only the welding condition. However, by the signal input from the determining section 13, the LCD display 31 can change over the display between the value sequentially input from the operating section 11, and the welding condition.

Further, the value sequentially input from the operating section 11 and its welding condition may be displayed simultaneously in the LCD display 31. Besides, the value that needs to be set in the welding condition selected at present may be displayed in the LCD display 31.

In this configuration, the welding conditions, sequentially input values, and necessary setting values in welding conditions can be displayed in the LCD display 31. As a result, the same effects as in the first exemplary embodiment are obtained. If the necessary setting values are controlled, the adjustment of input values is easy and accurate by referring to the values.

(Fifth Exemplary Embodiment)

Figure 9:
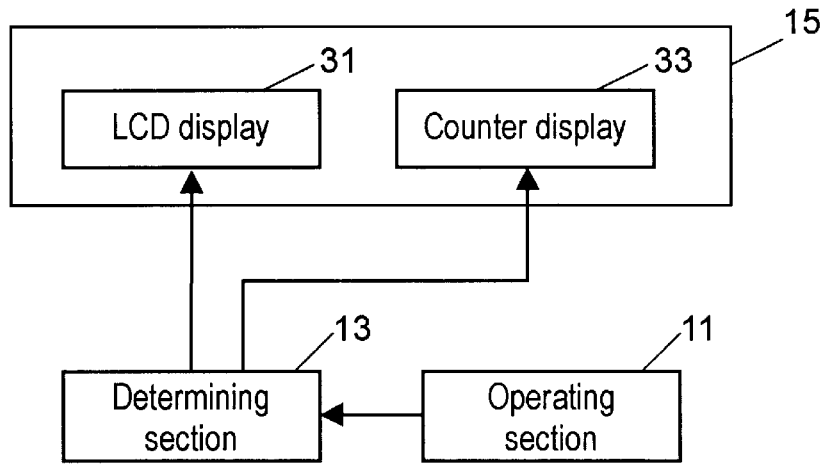
FIG. 9 is a block diagram showing a configuration of welding condition inputting equipment with LCD display and counter display.
Figure 10:
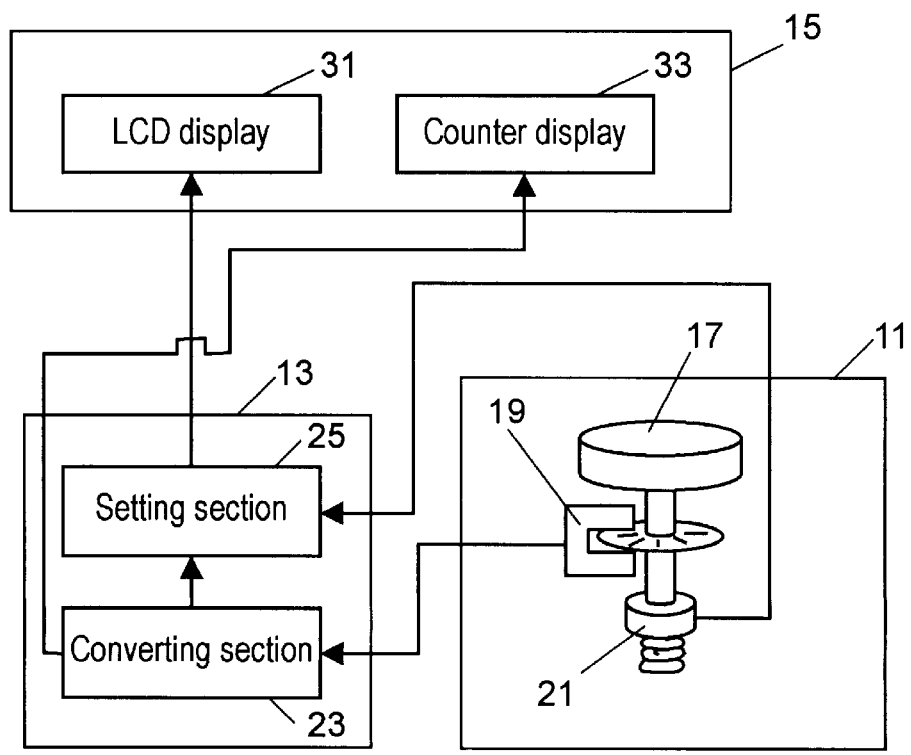
FIG. 10 is a block diagram showing a configuration of dial type welding condition inputting equipment with LCD display and counter display.

FIG. 9 and FIG. 10 are block diagrams showing a configuration of inputting equipment of the invention. The same components as in the foregoing embodiments are identified with the same reference numerals.

In FIG. 9, a counter display 35 (for example, 7-segment LED display device) is a second display unit, which shows the input value into the determining section 13 from the operating section 11.

The LCD display 31, which is a first display unit, shows the items of welding conditions. In this case, too, the LCD display 31 may show the item to be set, or all items or related item group, and display the presently selected welding condition so that it may be identified (for example, a flicker display signal).

In FIG. 10, when a dial 17 is turned for selecting an input value, the output of the numerical value indicating the amount of rotation of the converting section 23 is sequentially displayed in the counter display 33 as the adjusting value.

When the signal output from the switch 21 is input in the setting section 25, the adjusting value is determined as input value. Together with the welding condition selected in the setting section 25, the input value is displayed in the LCD display 31.

In this configuration, when the input value of the welding condition selected at present is determined, the display position of the numerical value indicating the amount of rotation is changed over from the counter display 33 to the LCD display 31. As a result, it is easily and accurately recognized whether the input value adjusting state (the numerical value indicating the amount of rotation being the adjusting value) or the input value determining state is conducted.

In FIG. 10, the signal input in the counter display 33 is output from the converting section 23, but it may be also output from the adding section 29 included in the components of the converting section 23.

In FIG. 10, the value of rotation is output from the converting section 23 into the counter display 33, but the value of rotation output from the converting section 23 may be output to the counter display 33 through the setting section 25.

Further, in the inputting equipment in FIG. 9 and FIG. 10, in the LCD display 31 and counter display 33, an arbitrary display can be set by the determining section 13. An example is given below.

The setting section 25 displays the selected welding condition and the previous input value of the condition in the LCD display 31. At the same time, the setting section 25 can display the numerical value of the welding condition being presently adjusted in the counter display 33.

Other examples relating to FIG. 10 are given below.

1) The converting section 23 (or adding section 29) displays the numerical values (adjusting values) showing the amount of rotation sequentially in the counter display 33.

2) Once the input value of the selected welding condition is determined, the dial 17 is used as a changeover dial for selecting the item group. The setting section 25 displays selection results of item group by dial (for example, the item to be set next and the value to be set) sequentially in the LCD display 31.

Concerning example 2), specific examples are given below.

2-1) The item to be set next is selected from the item group of welding conditions. At this time, the previous determined input value of the selected item is displayed.

2-2) The dial 17 is pushed in, and the signal output from the switch 21 is input into the setting section 25. The item of the selected welding condition is determined.

2-3) According to rotation of the dial 17, the setting section 25 outputs the adjusting value of the item selected at 2-2) (that is, returning to 1) above).

By repeating this operation, the input value is determined for each item in the item group of the welding conditions.

(Sixth Exemplary Embodiment)

Figure 11:
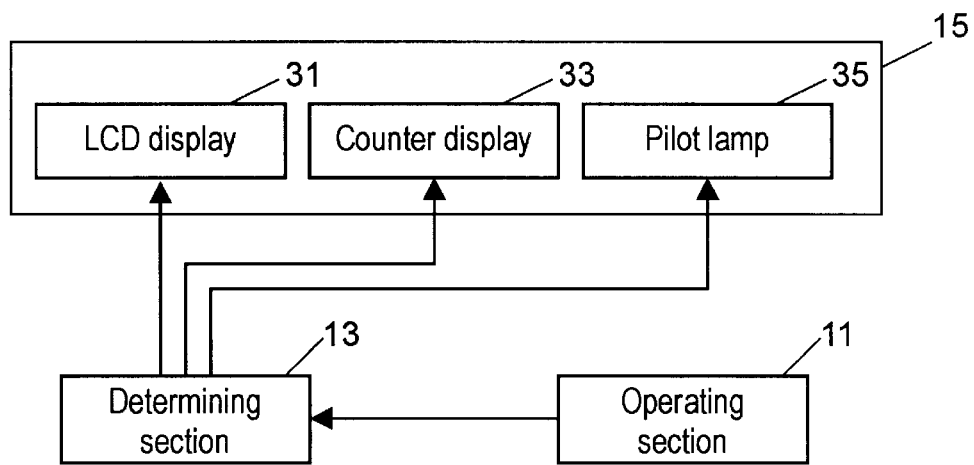
FIG. 11 is a block diagram showing a configuration of welding condition inputting equipment with LCD display, counter display and pilot lamp.
Figure 12:
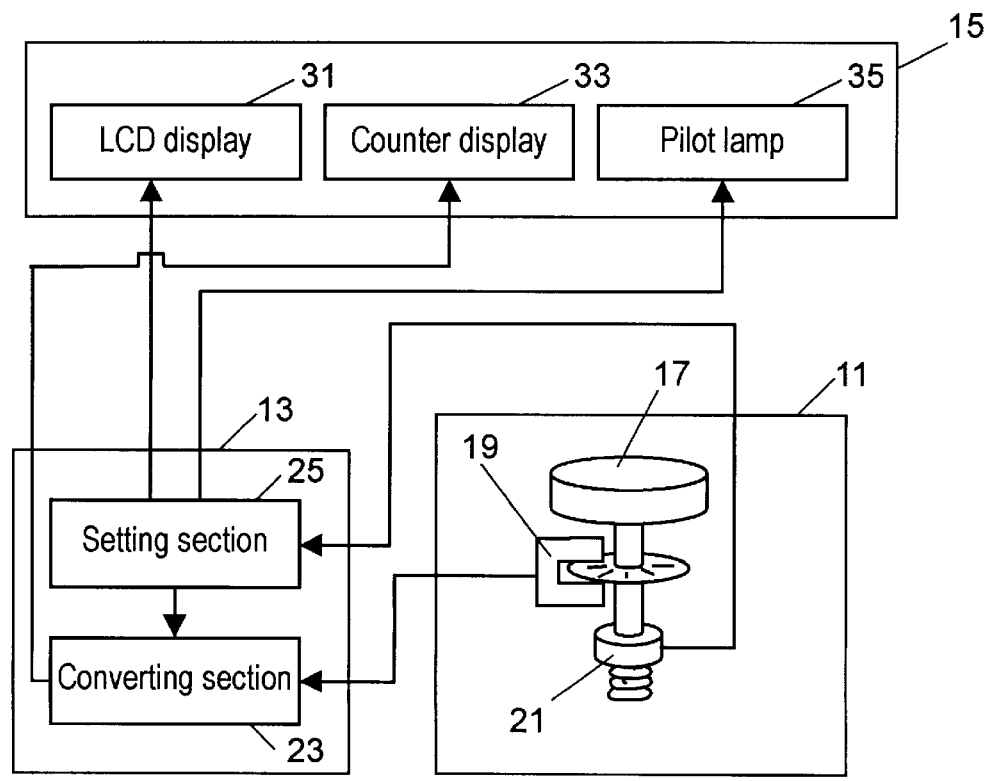
FIG. 12 is a block diagram showing a configuration of dial type welding condition inputting equipment with LCD display, counter display and pilot lamp.
Figure 13:
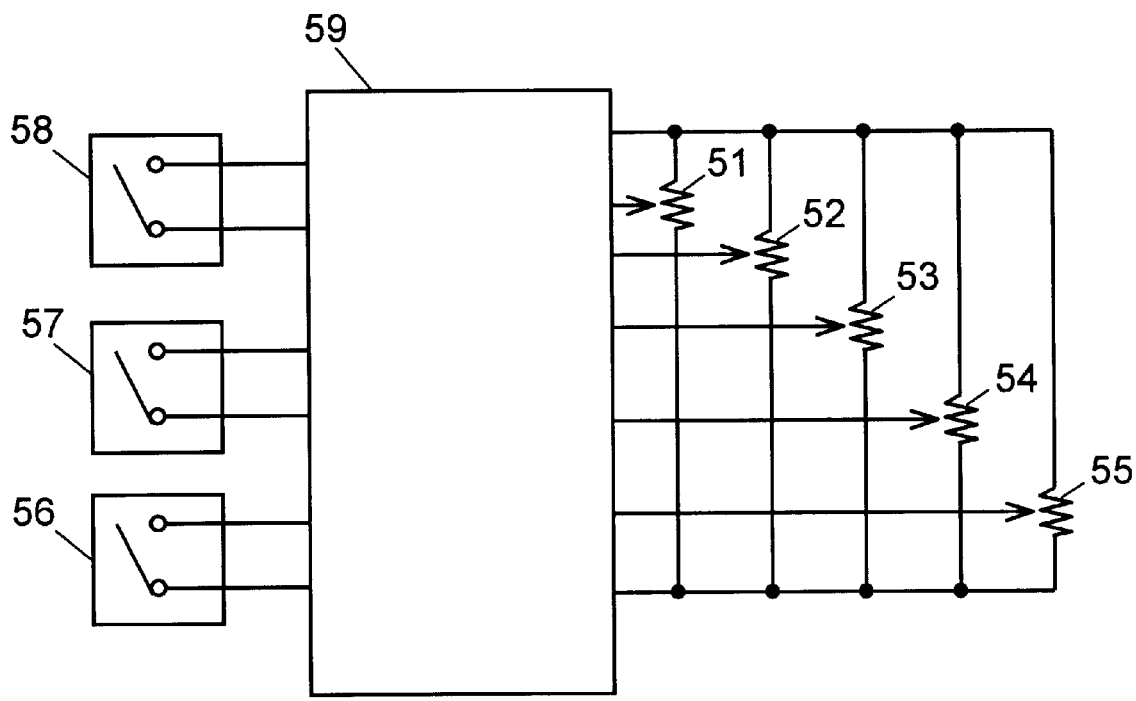
FIG. 13 is a block diagram of welding condition inputting equipment of a conventional arc welding machine.

FIG. 11 and FIG. 12 are block diagrams showing a configuration of inputting equipment of the invention. The same components as in the foregoing embodiments are identified with the same reference numerals.

In FIG. 11 and FIG. 12, a pilot lamp 35 is a third display unit, which displays the welding sequence is in which state (for example, initial welding, main welding, or crater welding), in the welding condition being selected at present, output from the setting section 25.

In this configuration, it is clearly known that the welding sequence is at which step of the entire operation in the welding condition being set at present.

The third display unit is not limited to the pilot lamp, but may be realized by liquid crystal device, LED display or the like.

In the embodiment, whether the item of the welding condition is selected i) by selecting the item of the welding condition by the dial or ii) by selecting by the determining section 13 is determined by selecting either i) or ii) in the determining section 13. In the case of ii), the determining section 13 presents items of welding conditions sequentially according to a preset program.

The inputting equipment of the first to sixth exemplary embodiments is used in the welding machine of arc discharge type. However, the inputting equipment of the invention may be also applied in general welders, or peripheral devices of the welder (for example, wire feeder, remote controller, torch).

What is claimed is:

1. A welding condition inputting equipment comprising:
   (a) an operating section for receiving a welding condition and outputting the welding condition;
   (b) a determining section for receiving the welding condition, selecting an item corresponding to the welding condition, and outputting the item; and
   (c) a display section for displaying the item input from said determining section, said operating section including:
      (a1) a dial operated by pushing in a direction of a rotary shaft;
      (a2) a detector for detecting an amount of rotation of said dial, and outputting a first signal indicating one of i) a numerical value of the welding condition and ii) an item of the welding condition, corresponding to the amount of rotation; and
      (a3) a switch coupled to said dial for outputting a second signal when said dial is pushed in, and
   said determining section including:
      (b1) a converting section for receiving the first signal and converting the first signal into a value indicating the amount of rotation; and
      (b2) a setting section for determining an input value according to the welding condition corresponding to the value indicating the amount of rotation when receiving the second signal, and selecting a next item of the welding condition, and outputting a signal to said display section,
   wherein,
      1) i) in case that the first signal indicates the numerical value of the welding condition, using the value indicating the amount of rotation as an adjusting value, said setting section sets the adjusting value as the input value when the second signal is input, and selects the next item of the welding condition, or
      ii) in case that said first signal indicates the item of the welding condition, said setting section selects an item being input when the second signal is input, and
      2) said setting section outputs a signal indicating at least one of the adjusting value, the input value and the selected item to said display section.

2. The welding condition inputting equipment of claim 1, wherein said converting section includes:
   (b11) an increasing/decreasing value converting section for converting said first signal into an increasing or decreasing value having a sign corresponding to a rotating direction of said dial; and
   (b12) an adding section for adding the increasing or decreasing value to a reference value to obtain as the adjusting value.

3. The welding condition inputting equipment of claim 2, wherein said setting section further outputs a signal indicating at least one of i) an item of the welding condition of which value is being set at present, ii) an item of the welding condition of which value is set next, iii) the adjusting value, iv) the input value, and v) the previous determined input value of the input value, to said display section.

4. The welding condition inputting equipment of claim 3, wherein said display section includes a liquid crystal display device as a first display unit.

5. The welding condition inputting equipment of claim 4, wherein said display section includes a second display unit for displaying at least one of the adjusting value and the input value.

6. The welding condition inputting equipment of claim 5, wherein said display section includes a third display unit for displaying an item of the welding condition being executed at present in a welding sequence.

7. The welding condition inputting equipment of claim 6, wherein said liquid crystal display device displays characters in plural lines.

8. The welding condition inputting equipment of claim 5, wherein i) until the adjusting value is set as the input value, said second display unit displays the adjusting value, and ii) when said second signal is input in said setting section, said liquid crystal display device displays the item of the selected welding condition.

9. The welding condition inputting equipment of claim 8, wherein said liquid crystal display device displays characters in plural lines.

10. The welding condition inputting equipment of claim 5, wherein said liquid crystal display device displays characters in plural lines.

11. The welding condition inputting equipment of claim 4, wherein said liquid crystal display device displays characters in plural lines.

12. The welding condition inputting equipment of claim 2, wherein said display section includes a liquid crystal display device as a first display unit.

13. The welding condition inputting equipment of claim 12, wherein said display section includes a second display unit for displaying at least one of the adjusting value and the input value.

14. The welding condition inputting equipment of claim 13, wherein said display section includes a third display unit for displaying an item of the welding condition being executed at present in a welding sequence.

15. The welding condition inputting equipment of claim 14, wherein said liquid crystal display device displays characters in plural lines.

16. The welding condition inputting equipment of claim 13, wherein i) until the adjusting value is set as the input value, said second display unit displays the adjusting value, and ii) when said second signal is input in said setting section, said liquid crystal display device displays the item of the selected welding condition.

17. The welding condition inputting equipment of claim 16, wherein said liquid crystal display device displays characters in plural lines.

18. The welding condition inputting equipment of claim 13, wherein said liquid crystal display device displays characters in plural lines.

19. The welding condition inputting equipment of claim 12, wherein said liquid crystal display device displays characters in plural lines.

20. The welding condition inputting equipment of claim 2,
wherein said display section includes a third display unit for displaying an item of the welding condition being executed at present in a welding sequence.

21. The welding condition inputting equipment of claim 20,
wherein said liquid crystal display device displays characters in plural lines.

22. The welding condition inputting equipment of claim 1,
wherein said setting section further outputs a signal indicating at least one of i) an item of the welding condition of which value is being set at present, ii) an item of the welding condition of which value is set next, iii) the adjusting value, iv) the input value, and v) the previous determined input value of the input value, to said display section.

23. The welding condition inputting equipment of claim 22,
wherein said display section includes a liquid crystal display device as a first display unit.

24. The welding condition inputting equipment of claim 23,
wherein said display section includes a second display unit for displaying at least one of the adjusting value and the input value.

25. The welding condition inputting equipment of claim 24,
wherein said display section includes a third display unit for displaying an item of the welding condition being executed at present in a welding sequence.

26. The welding condition inputting equipment of claim 25,
wherein said liquid crystal display device displays characters in plural lines.

27. The welding condition inputting equipment of claim 24,
wherein i) until the adjusting value is set as the input value, said second display unit displays the adjusting value, and ii) when said second signal is input in said setting section, said liquid crystal display device displays the item of the selected welding condition.

28. The welding condition inputting equipment of claim 27,
wherein said liquid crystal display device displays characters in plural lines.

29. The welding condition inputting equipment of claim 24,
wherein said liquid crystal display device displays characters in plural lines.

30. The welding condition inputting equipment of claim 23,
wherein said liquid crystal display device displays characters in plural lines.

31. The welding condition inputting equipment of claim 1,
wherein said display section includes a liquid crystal display device as a first display unit.

32. The welding condition inputting equipment of claim 31,
wherein said display section includes a second display unit for displaying at least one of the adjusting value and the input value.

33. The welding condition inputting equipment of claim 32,
wherein said display section includes a third display unit for displaying an item of the welding condition being executed at present in a welding sequence.

34. The welding condition inputting equipment of claim 33,
wherein said liquid crystal display device displays characters in plural lines.

35. The welding condition inputting equipment of claim 32,
wherein i) until the adjusting value is set as the input value, said second display unit displays the adjusting value, and ii) when said second signal is input in said setting section, said liquid crystal display device displays the item of the selected welding condition.

36. The welding condition inputting equipment of claim 35,
wherein said liquid crystal display device displays characters in plural lines.

37. The welding condition inputting equipment of claim 32,
wherein said liquid crystal display device displays characters in plural lines.

38. The welding condition inputting equipment of claim 31,
wherein said liquid crystal display device displays characters in plural lines.

39. The welding condition inputting equipment of claim 1,
wherein said display section includes a third display unit for displaying an item of the welding condition being executed at present in a welding sequence.

40. The welding condition inputting equipment of claim 39,
wherein said liquid crystal display device displays characters in plural lines.

* * * * *